Patented Jan. 23, 1940

2,187,719

UNITED STATES PATENT OFFICE

2,187,719

DERIVATIVE OF HEXAMETHYLENE-DI-THIO-CARBAMIC ACID

Ira Williams, Woodstown, N. J., assignor to E. I. du Pont de Nemours & Company, Wilmington, Del., a corporation of Delaware No Drawing. Application June 10, 1938, Serial No. 212,978

9 Claims. (Cl. 260—239)

This invention relates to a class of new chemical compounds and more particularly to relatively stable derivatives of a dithio-carbamic acid.

Many dithio-carbamic acids, substituted dithio-carbamic acids and their salts, esters and sulfides are known. Ammonia, for example, reacts readily with carbon disulfide in alcoholic solution to form the ammonium salt of dithio-carbamic acid. The free acid is extremely unstable and decomposes immediately. In a similar manner, dithio-carbamic acid derivatives can be prepared from primary alkylamines and primary arylamines. The sodium, zinc and ammonium salts of many of the dithio-carbamic acids can be prepared, as well as the sulfides and esters, but in general, these compounds decompose rather rapidly on storage, even at room temperature. Dithio-carbamates have also been prepared from imines such as piperidine. The piperidine salt of pentamethylene dithio-carbamic acid is a pale cream colored solid, which readily decomposes when in contact with even traces of moisture. The sodium salt of pentamethylene dithio-carbamic acid is very soluble in water, but decomposes in water solution to produce a brown oil which floats on the water.

It is an object of the present invention to supply a more stable class of dithio-carbamic acid derivatives. It is a further object to provide a class of dithio-carbamic acid derivatives which are particularly stable in the presence of moisture and at elevated temperatures. It is a still further object to provide methods for preparing more stable derivatives of dithio-carbamic acids. Other objects are to provide new chemical compounds and to advance the art. Still other objects will appear hereinafter.

The above and other objects of my invention may be accomplished by preparing a class of derivatives of a hexamethylene dithio-carbamic acid. Hexamethylene dithio-carbamic acid is the dithio-carbamic acid prepared from hexamethylene imine. Hexamethylene imine is readily prepared by splitting out ammonia from 1 molecule of 1:6-hexane-diamine. This product readily reacts with carbon disulfide according to the following equation:

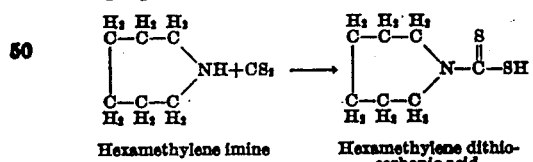

Hexamethylene imine    Hexamethylene dithiocarbonic acid

The hexamethylene dithio-carbamic acid reacts immediately with an excess of basic or salt-forming element to form a salt of the acid. Other derivatives of the hexamethylene dithio-carbamic acid can be prepared by any of the methods known to the art for preparing similar derivatives of similar dithio-carbamic acids, such as pentamethylene dithio-carbamic acid, which methods result in the replacement of the hydrogen connected to sulfur by a salt-forming group or element, or by an organic radicle.

The compounds of my invention may be represented by the formula

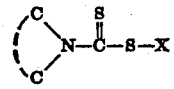

in which the group

represents a saturated carbon chain of 6 carbon atoms, the terminal carbon atoms of which are singly bonded to N. All of these compounds contain the radicle

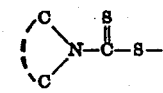

In order to more clearly illustrate my invention and the preferred modes of carrying the same into effect, the following examples are given:

Example I 9.9 grams of hexamethylene imine were added to 50 ccm. of low boiling gasoline. This solution was treated, while being cooled to about 5° C., with 3.8 grams of carbon disulfide which was added slowly and with stirring. The white precipitate which resulted was filtered off, washed with petroleum ether and dried in air. The resulting hexamethylene imine salt of hexamethylene dithio-carbamic acid was a pale cream colored powder. A portion was crystallized from alcohol to form white needles, melting at 147° C. The product is stable for long periods when exposed to the air or in water solution. This compound may be represented by the formula

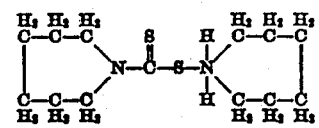

Example II 20 grams of sodium hydroxide were dissolved in 200 cc. of water and cooled to 5° C. 50 grams of hexamethylene imine and 38 grams of carbon disulfide were added alternately in small portions and with good stirring. The sodium salt of hexamethylene dithio-carbamic acid began to crystallize from the solution and was recovered as a white solid by evaporation of the water and drying at 110° C. This compound may be represented by the formula

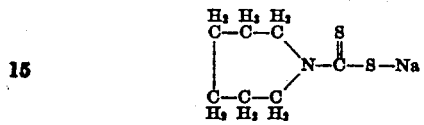

Example III 0.1 mole of the sodium salt of hexamethylene dithio-carbamic acid, dissolved in 300 cc. of water at 3° C., was treated with 100 cc. of 2% hydrogen peroxide. Dilute hydrochloric acid was then added at a rate just sufficient to keep the solution alkaline to Congo red. When alkali ceased to be liberated, the precipitate was filtered off and crystallized from alcohol. The di-hexamethylene thiuram disulfide separated as pale cream colored crystals, melting at 110° C. This compound may be represented by the formula

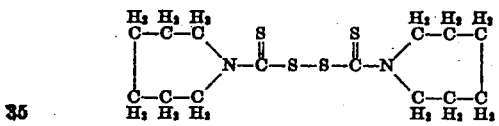

Example IV 0.1 mole of sodium hexamethylene dithiocarbamate was dissolved in 250 cc. of water containing 8 grams of sodium carbonate. Phosgene was passed through the liquid, which was cooled to 5° C., until no more precipitate was formed. The carbonyl ester of hexamethylene dithio-carbamic acid having the formula

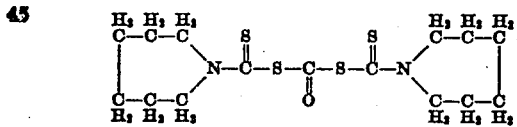

separated as a yellow waxy solid.

Example V 20 grams of the carbonyl ester of hexamethylene dithio-carbamic acid were heated slowly to a temperature of 80° C. Decomposition started at about 60° C. with elimination of carbonoxy sulfide and formation of the thiuram monosulfide. The yellow decomposition product was crystallized from alcohol to form bright yellow plates of di-hexamethylene thiuram monosulfide melting at 92° C. This compound may be represented by the formula

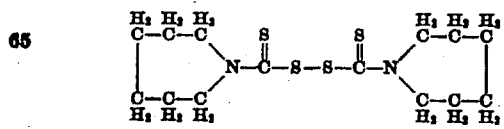

Example VI 0.2 mole of sodium hexamethylene dithiocarbamate, dissolved in 600 cc. of water, was treated with 0.1 mole of zinc chloride by slow addition with stirring. A thick white slurry of zinc hexamethylene dithio-carbamate resulted and was filtered off and washed. The dry product melted at 175° C. and has the formula

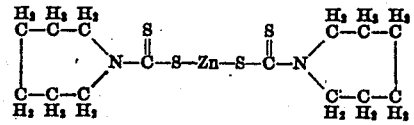

Example VII

Cadmium chloride was substituted for the zinc chloride used in Example VI. The resulting pale cream colored powder melted at 230° C. and had the formula

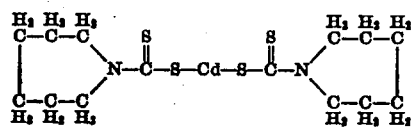

Example VIII 0.2 mole of sodium hexamethylene dithio-carbamate was treated with 0.2 mole of benzyl chloride in 300 cc. of alcohol and held at 50° C. for 30 minutes. The precipitated sodium chloride was filtered off and the filtrate treated with water. Benzyl hexamethylene dithio-carbamate separated as a slightly viscous straw colored liquid and may be represented by the formula

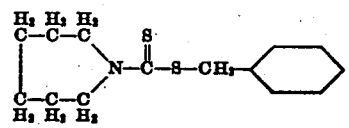

Example IX 0.2 mole of sodium hexamethylene dithiocarbamate was treated with 0.2 mole 2:4-dinitro-1-chlor-benzene in 300 cc. alcohol and heated for 30 minutes at 50° C. The reaction mass was treated with water to dissolve the sodium chloride. The residue was crystallized from alcohol to form bright yellow needles of 2:4-dinitrophenyl-hexamethylene dithio-carbamate which melted at 108° C. This compound may be represented by the formula

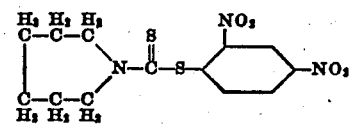

Example X

The butyl ester of hexamethylene dithio-carbamic acid, prepared under the conditions of Example VIII, was a straw colored liquid having the formula

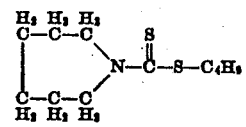

In order to illustrate the improved stability of the compounds of my invention over similar compounds heretofore known, the following examples are given:

Example XI

A 1% solution of the hexamethylene imine salt of hexamethylene dithio-carbamic acid in water was boiled for thirty minutes, during which time the solution remained entirely clear. A 1% solution of pentamethylene-ammonium-pentamethylene-dithio-carbamate in water became covered with a brown oil after boiling for only ten minutes.

Example XII

A 1% solution of di-hexamethylene-thiuram-mono-sulfide in 95% ethyl alcohol was prepared and allowed to stand in a closed glass container. At the end of four months, the solution was still clear. A similar solution of tetra-methyl-thiuram-mono-sulfide, stored under the same conditions, showed a substantial precipitate of decomposition products after one month.

The preceding examples are given for illustrative purposes only. Numerous other derivatives of the hexamethylene dithio-carbamic acid can be prepared in a similar manner. For example, the hexamethylene dithio-carbamic acid salts of any metallic element may be prepared. Among such salts, the more important appear to be the salts of monovalent and divalent elements such as potassium, calcium, barium, iron, chromium, copper, lead, mercury, manganese, magnesium and tin. Other salts may be prepared such as the salts of ammonia and substituted ammonias such as:

Mono-methyl-ammonium-hexamethylene-dithio-carbamate
Dimethyl-ammonium-hexamethylene-dithio-carbamate
Diethyl-ammonium-hexamethylene-dithio-carbamate
Dibutyl-ammonium-hexamethylene-dithio-carbamate
Hexyl-ammonium-hexamethylene-dithio-carbamate
Dicyclohexyl-ammonium-hexamethylene-dithio-carbamate
Mono-phenyl-ammonium-hexamethylene-dithio-carbamate
Diphenyl-ammonium-hexamethylene-dithio-carbamate
Mono-tolyl-ammonium-hexamethylene-dithio-carbamate
Ditolyl-ammonium-hexamethylene-dithio-carbamate
Piperdinium-hexamethylene-dithio-carbamate
Pyridinium-hexamethylene-dithio-carbamate
Diphenyl-guanidine salt of hexamethylene dithio-carbamic acid
Ethanolamine salt of hexamethylene dithio-carbamic acid
Hexamethylene-tetramine salt of hexamethylene dithio-carbamic acid
Hexamethylene-diimine salt of hexamethylene dithio-carbamic acid
1:6-hexane-diamine salt of hexamethylene dithio-carbamic acid
Diaryl-guanidine salts of hexamethylene dithio-carbamic acid Further various esters of the hexamethylene dithio-carbamic acid may be prepared as follows:

Di-nitro-chlorphenyl-hexamethylene-dithio-carbamate
Picryl-hexamethylene-dithio-carbamate
Phenyl-hexamethylene-dithio-carbamate
Naphthyl-hexamethylene-dithio-carbamate
Anthracyl-hexamethylene-dithio-carbamate
Ethyl-hexamethylene-dithio-carbamate
Propyl-hexamethylene-dithio-carbamate
Butyl-hexamethylene-dithio-carbamate
Isobutyl-hexamethylene-dithio-carbamate
Lauryl-hexamethylene-dithio-carbamate
Oleyl-hexamethylene-dithio-carbamate
Benzoyl-hexamethylene-dithio-carbamate
Dimethyl-carbamyl-hexamethylene-dithio-carbamate
Diethyl-carbamyl-hexamethylene-dithio-carbamate
Dibutyl-carbamyl-hexamethylene-dithio-carbamate
Diphenyl-carbamyl-hexamethylene-dithio-carbamate
Phenyl-methyl-carbamyl-hexamethylene-dithio-carbamate
Ditolyl-carbamyl-hexamethylene-dithio-carbamate
Phenyl-ethyl-carbamyl-hexamethylene-dithio-carbamate
Tolyl-methyl-carbamyl-hexamethylene-dithio-carbamate
Tolyl-ethyl-carbamyl-hexamethylene-dithio-carbamate
Phenyl-butyl-carbamyl-hexamethylene-dithio-carbamate In other words, esters may be made by the esterification of alcohols or phenols, or by the reaction of a metal salt of hexamethylene-dithio-carbamic acid with an acid chloride such as benzoyl chloride or a carbamyl chloride. Many other salts and esters will be readily apparent to those skilled in the art.

The various derivatives of hexamethylene dithio-carbamic acid have been found to be useful for a variety of purposes such as insecticides, fungicides, acid inhibitors, and as accelerators for the vulcanization of rubber, particularly for the vulcanization of latex.

While I have disclosed the preferred embodiments of my invention and the preferred modes of carrying the same into effect, it will be readily apparent that many variations may be made therein, particularly in the derivatives prepared and the methods of preparing them, without departing from the spirit of my invention. Accordingly the scope of my invention is to be limited solely by the appended claims construed as broadly as is permissible in view of the prior art.

I claim:

1. A dithio-carbamic acid derivative having the formula

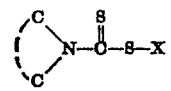

in which the group

represents a saturated carbon chain of 6 carbon atoms, the terminal carbon atoms of which are singly bonded to N, and in which X represents a member of the group consisting of salt-forming elements, salt-forming groups and organic radicles.

2. A hexamethylene dithio-carbamic acid compound of the group consisting of salts of hexamethylene dithio-carbamic acid, thiuram sulfides of hexamethylene dithio-carbamic acid and esters of hexamethylene dithio-carbamic acid.

3. A salt of hexamethylene dithio-carbamic acid.

4. A metal salt of hexamethylene dithio-carbamic acid.

5. An ammonium salt of hexamethylene dithio-carbamic acid.

6. A hexamethylene thiuram sulfide.

7. Zinc hexamethylene dithio-carbamate.

8. The hexamethylene imine salt of hexamethylene dithio-carbamic acid.

9. Di-hexamethylene thiuram di-sulfide.

IRA WILLIAMS.

Certificate of Correction

Patent No. 2,187,719.

January 23, 1940.

IRA WILLIAMS

It is hereby certified that errors appear in the printed specification of the above numbered patent requiring correction as follows: Page 1, first column, line 55, in the formula, for "carbonic acid" read *carbamic acid*; page 2, first column, lines 64 to 68 inclusive, Example V, strike out the formula and insert instead the following—

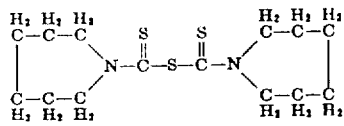

and that the said Letters Patent should be read with these corrections therein that the same may conform to the record of the case in the Patent Office.

Signed and sealed this 12th day of March, A. D. 1940.

[SEAL]

HENRY VAN ARSDALE,
*Acting Commissioner of Patents.*